United States Patent Office 3,261,826
Patented July 19, 1966

3,261,826
MONOAZO TRIAZINE CONTAINING DYESTUFFS
Herbert Francis Andrew, Manchester, England, assignor to Imperial Chemical Industries Limited, London, England, a corporation of Great Britain
No Drawing. Filed May 13, 1963, Ser. No. 280,085
Claims priority, application Great Britain, May 28, 1962, 20,371/62
6 Claims. (Cl. 260—153)

This invention relates to new azo dyestuffs and more particularly it relates to new naphthalene monoazo triazine dyestuffs which are valuable for colouring cellulose textile materials.

In UK specification No. 899,376 there are described and claimed new monoazo dyestuffs which, in the form of the free acids are represented by the formula:

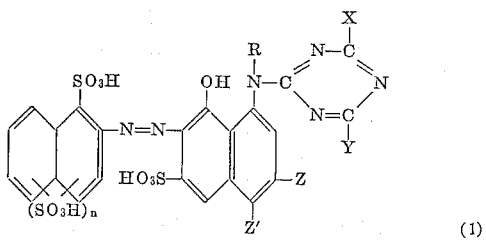

(1)

wherein R represents a hydrogen atom or a substituted or unsubstituted alkyl radical containing from 1 to 4 carbon atoms, X represents a chlorine or a bromine atom, Y represents a substituent containing at most 13 carbon atoms which is directly attached to the triazine ring or is attached through an oxygen, sulphur or nitrogen atom, Z and Z' each represent a hydrogen atom or a sulphonic acid group and can be the same or different and $n$ represents 0, 1 or 2, provided that the monoazo dyestuffs contain at least three sulphonic acid groups.

It has now been found that the dyestuffs of this formula wherein one of Z and Z' stands for a hydrogen atom and the other for a sulphonic acid group, and Y stands for an o-carboxyanilino group containing a second carboxyl group or a sulphonic acid group have particularly valuable properties in that, in addition to yielding shades fast to treatments with hypochlorite bleach and fast to washing treatments, even after prolonged storage in humid atmospheres, the new dyestuffs in which Y, Z and Z' have the stated meaning, are capable of building up to give very strong bluish-red shades.

According to the present invention, therefore, there are provided the monoazo compounds of Formula 1 above, wherein R, X and $n$ have the meanings stated above, one of Z and Z' stands for a hydrogen atom and the other for a sulphonic acid group and Y stands for an o-carboxyphenylamino group which contains a second carboxylic acid group or a sulphonic acid group.

As examples of groups represented by Y, there can be mentioned for example, 2-carboxy-5-sulphoanilino, 2-carboxy-4-sulphoanilino and 2,5-dicarboxyanilino. The dyestuffs in which R stands for a hydrogen atom are preferred.

The new azo dyestuffs can be obtained by condensation or by coupling. Thus they can be obtained by condensing 1 mole of cyanuric chloride or cyanuric bromide with 1 mole of an amino azo compound of the formula:

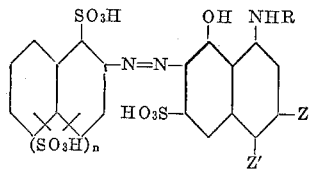

(2)

wherein R stands for a hydrogen atom or a substituted or unsubstituted alkyl radical having one to four carbon atoms, one of Z and Z' stands for a hydrogen atom and the other for a sulphonic acid group and $n$ stands for 0, 1 or 2, and with one mole of an anthranilic acid which contains a second carboxylic acid group or a sulphonic acid group.

The condensation consists of two stages which can conveniently be carried out in either order, as desired. The first stage is advantageously carried out at a temperature of 0 to 20° C. and the second at a temperature of about 40 to 50° C. The reaction mixture is preferably maintained in a neutral or slightly acid condition, i.e. at a pH between 5 and 7 during the condensation, for example, by adding an acid-binding agent to neutralise the acid as it is formed. The function of the acid-binding agent is solely to neutralise this acid and any acid-binding agent can be used provided that it does not form an insoluble salt of the dyestuff or provided that it is not present at any time in such quantity as to induce hydrolysis of the reactants or product.

As examples of sulpho- or carboxy-anthranilic acids which can be used, there may be mentioned, for example, 4- and 5-sulphoanthranilic acid and aminoterephthalic acid.

The aminoazo compounds of Formula 2 can themselves be obtained by diazotising an amine of the formula:

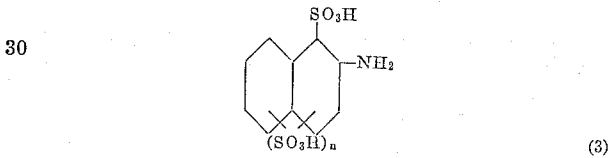

(3)

wherein $n$ stands for 0, 1 or 2 and coupling the diazonium compound so obtained under alkaline conditions (for example in the presence of sodium carbonate) with an aminonaphthol sulphonic acid of the formula:

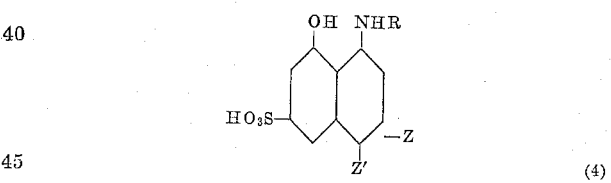

(4)

wherein R stands for a substituted or unsubstituted alkyl group having 1 to 4 carbon atoms, one of Z and Z' stands for a hydrogen atom and the other for a sulphonic acid group.

As examples of amines of Formula 3 there may be mentioned, for example, 2-naphthylamine-1-sulphonic acid, 2-naphthylamine-1,5-, 1,6- and 1,7-disulphonic acids and 2-naphthylamine-1,5,7-trisulphonic acids.

As examples of aminonaphthol sulphonic acids of Formula 4 there may be mentioned, for example, 1-amino-8-naphthol-3,6- and 4,6-disulphonic acids, and the corresponding N-methyl, N-ethyl and N-butyl compounds.

The new azo dyestuffs can also be obtained by diazotising an amine of Formula 3 above, where $n$ stands for 0, 1 or 2, and coupling the diazonium compound so obtained with 1 mole of a coupling component of the formula:

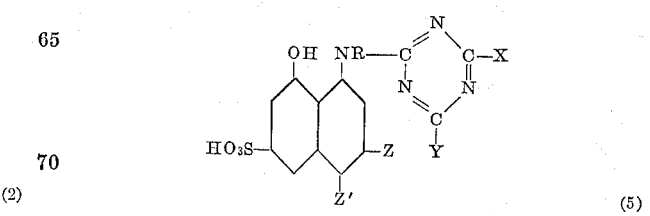

(5)

wherein R stands for a substituted or unsubstituted alkyl group having 1 to 4 carbon atoms, one of ZP and Z' stands for a hydrogen atom and the other for a sulphonic acid group, X stands for a chlorine or a bromine atom and Y stands for an o-carboxyanilino group containing a second carboxylic acid group or a sulphonic acid group.

The compounds of Formula 5 can themselves be obtained by condensing cyanuric chloride or cyanuric bromide with one mole of an aminonaphthol sulphonic acid of Formula 4 and with one mole of anthranilic acid which contains a second carboxylic acid group or a sulphonic acid group.

The coupling is preferably carried out in a mildly alkaline solution, for example in the presence of sodium carbonate.

The new monoazo dyestuffs can be isolated by customary techniques for the isolation of water-soluble dyestuffs, for example by spray-drying or by precipitating the dyestuff in the form of its sodium salt by adding sodium chloride to the reaction medium and filtering off and drying the resultant precipitate.

The new monoazo dyestuffs of the invention are valuable for colouring cellulose textile materials such as cotton, linen and viscose rayon. For coloring the cellulose textile materials the monoazo dyestuffs can be applied by either a dyeing or a printing process, preferably in conjunction with a treatment with an acid-binding agent such as sodium carbonate or a substance such as sodium bicarbonate which on heating liberates an acid-binding agent, the said treatment being carried out before, during or after the application of the dyestuffs. When so applied to cellulose textile materials the new monoazo dyes yield bluish-red shades which posses excellent fastness to treatments with hypochlorite bleach to wet treatments such as washing, even after the coloured cellulose textile materials have been subjected to prolonged storage in a humid atmosphere. They can be built-up to give very strong shades having these properties and which are remarkably free from staining during the usual washing-off treatments.

The new dyestuffs of the invention have also excellent stability in print pastes in that there is little or no decomposition of the dyestuffs when the print pastes are stored before use, so that there is little or no loss in the tinctorial strengths of the print pastes.

The invention is illustrated but not limited by the following examples in which the parts are by weight.

*Example 1*

A solution of 30.9 parts of the trisodium salt of 1-amino-8-hydroxy-2':7-azonaphthalene-1':3:6-trisulphonic acid in 200 parts of water is added during 20 minutes to a stirred mixture of 9.6 parts of cyanuric chloride, 80 parts of acetone, 50 parts of ice and 100 parts of water, the mixture being maintained at a temperature between 0° and 5° C. The mixture is stirred at a temperature between 0° and 5° C. for ½ hour then neutralised to pH 7 by the addition of 25 parts of a 10% aqueous solution of sodium carbonate. When condensation of the aminomonoazo compound is complete a solution of 14.4 parts of the disodium salt of 4-sulpho-2-aminobenzoic acid in 100 parts of water is added to the mixture and the latter is then heated at a temperature between 40° and 50° C. for two hours the pH being maintained at 7 by the addition of 30 parts of a 20% aqueous solution of sodium carbonate. The solution is treated with 50 parts of sodium chloride, filtered and the residue on the filter is then dried.

The dyestuff composition so obtained is found to contain 0.92 atom of organically bound chlorine for each azo group present.

It colours cellulose textile materials in bluish-red shades fast to hypochlorite bleach and to washing. Furthermore the dyeings are stable when stored in a moist atmosphere.

*Example 2*

By replacing the 14.4 parts of the disodium salt of 4-sulpho-2-aminobenzoic acid used in Example 1 by 14.4 parts of the disodium salt of 5-sulpho-2-aminobenzoic acid there is obtained a dyestuff with similar shade and fastness properties.

*Example 3*

By replacing the 9.6 parts of cyanuric chloride used in Example 1 by 16.5 parts of cyanuric bromide, there is obtained a dyestuff which contains 0.97 atom of organically bound bromine for each azo group present and which has similar shade and dyeing properties to the dyestuff of Example 1.

The following table gives further examples of the invention which are obtained by condensing the aminomonoazo compound in the second column with the trihalogenotriazine in the third column and reacting the dihalogenotriazinyl compound so obtained with the substituted anthanilic acid listed in the fourth column of the table. All have bluish-red shades.

| Example | Aminoazo compound | Triazine | Substituted anthranilic acid |
|---|---|---|---|
| 4 | 1-amino-8-hydroxy-7(1'-sulphonaphth-2'-ylazo) naphthalene-4:6-disulphonic acid. | Cyanuric chloride | 4-sulpho-2-aminobenzoic acid. |
| 5 | ----do---- | ----do---- | 5-sulpho-2-aminobenzoic acid. |
| 6 | ----do---- | Cyanuric bromide | 4-sulpho-2-aminobenzoic acid. |
| 7 | 1-amino-8-hydroxy-7(1':5'-disulphonaphth-2'-ylazo) naphthalene-4:6-disulphonic acid. | Cyanuric chloride | 4-sulpho-2-aminobenzoic acid. |
| 8 | ----do---- | ----do---- | 2:5-dicarboxy aniline. |
| 9 | 1-N-butylamino-8-hydroxy-7(1':5'-disulphonaphth-2'-ylazo)naphthalene-3:6-disulphonic acid. | ----do---- | 5-sulpho-2-aminobenzoic acid. |
| 10 | 1-N-ethylamino-8-hydroxy-7(1'-sulphonaphth-2'-ylazo) naphthalene-3:6-disulphonic acid. | ----do---- | 4-sulpho-2-aminobenzoic acid. |
| 11 | 1-amino-8-hydroxy-7-(1':5'-disulphonaphth-2'-ylazo) naphthalene-3:6-disulphonic acid. | ----do---- | Do. |
| 12 | ----do---- | ----do---- | Amino terephthalic acid. |
| 13 | ----do---- | ----do---- | 5-sulpho-2-aminobenzoic acid. |
| 14 | 1-amino-8-hydroxy-7-(1':5':7'-trisulphonaphth-2'-ylazo)naphthalene-3:6-disulphonic acid. | ----do---- | Do. |
| 15 | ----do---- | ----do---- | 4-sulpho-2-aminobenzoic acid. |

*Example 16*

A solution of 1.72 parts of sodium nitrite in 12.5 parts of water is added with stirring to a suspension of 7.13 parts of 2-napthylamino-1:5-disulphonic acid in a mixture of 80 parts of water and 7.5 parts of a concentrated aqueous solution of hydrochloric acid, the temperature of the mixture being maintained between 0° and 5° C. by external cooling. The mixture is stirred for 10 minutes, sodium bicarbonate is added until the pH of the mixture is 7 and the mixture containing the diazo compound is then added to a solution of 19.2 parts of the tetrasodium salt of the compound obtained by condensing 1 molecular proportion of cyanuric chloride with one molecular proportion of 1-amino-8-naphthol-4:6-disulphonic acid and one molecular proportion of 4-sulpho-2-aminobenzoic acid. The mixture is stirred at 0°–5° C. for 18 hours, the pH being maintained at 7 by the addition of sodium carbonate. 70 parts of sodium chloride are added and the product which is precipitated is filtered off and is then dried.

When applied to cellulose textile materials in conjunction with a treatment with an acid-binding agent, the dyestuff so obtained yields bluish-red shades which are identical with those obtained from the dyestuff of Example 4.

*Example 17*

A solution of 19 parts of the disodium salt of 2-(4':6'-dichloro-s-triazine-2'-ylamino)-5-sulphobenzoic acid in 300 parts of water and 50 parts of acetone is added with stirring to a solution of 30.9 parts of the trisodium salt of 1 - amino - 8 - hydroxy-2':7 azonaphthalene-1':3:6-trisulphonic acid in 250 parts of water and the mixture is heated for 2½ hours at a temperature between 40° C. and 45° C., the pH being maintained at 7 by the addition of a 10% aqueous solution of sodium carbonate. 100 parts of sodium chloride are then added to the mixture and the product which is precipitated is filtered off and is then dried. The dyestuff so obtained is identical with the dyestuff of Example 1.

I claim:
1. Monoazo dyestuffs of the formula:

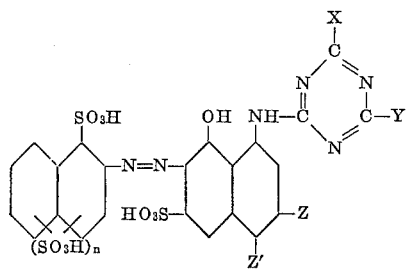

wherein $n$ has a meaning of from 0 to 2, one of Z and Z' stands for a hydrogen atom and the other for a sulphonic acid group, X stands for a halogen atom selected from the class consisting of chlorine and bromine and Y stands for an o-carboxyanilino radical carrying a single further substituent on the benzene ring selected from the class consisting of carboxylic and sulphonic acid groups.

2. The dyestuff of the formula:

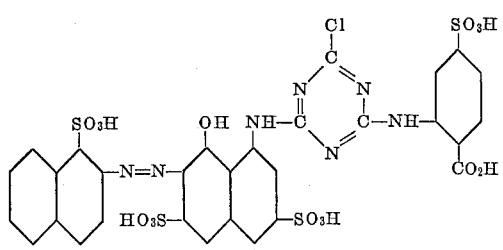

3. The dyestuff of the formula:

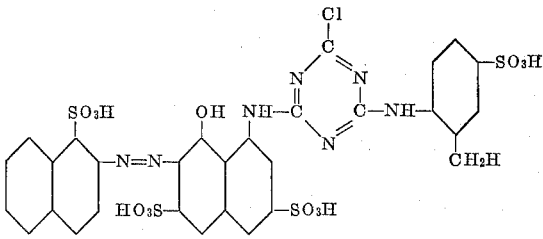

4. The dyestuff of the formula:

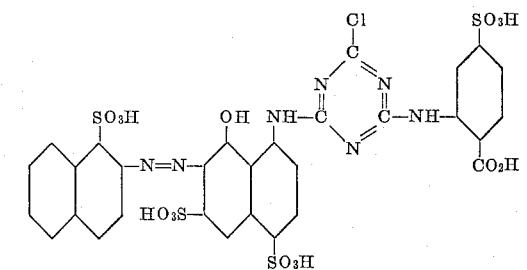

5. The dyestuff of the formula:

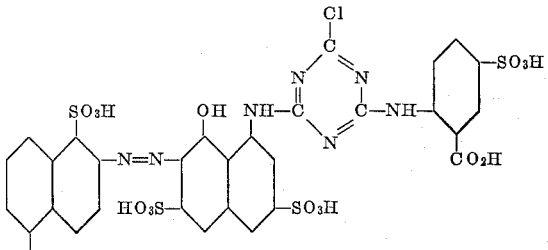

6. The dyestuff of the formula:

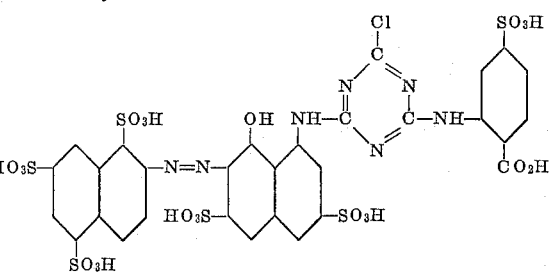

References Cited by the Examiner

UNITED STATES PATENTS

| | | | |
|---|---|---|---|
| 2,910,464 | 10/1959 | Fasciati et al. | 260—153 |
| 2,931,794 | 5/1960 | Ruetimeyer et al. | 260—153 X |
| 2,943,084 | 6/1960 | Buehler et al. | 260—145 |
| 2,945,021 | 7/1960 | Fasciati et al. | 260—153 |
| 2,951,070 | 8/1960 | Stephen et al. | 260—153 |

FOREIGN PATENTS 859,990  1/1961  Great Britain.

CHARLES B. PARKER, *Primary Examiner.*

R. J. FINNEGAN, D. M. PAPUGA, *Assistant Examiners.*